US012687286B2

(12) United States Patent
Tan et al.

(10) Patent No.: US 12,687,286 B2
(45) Date of Patent: Jul. 21, 2026

(54) INTEGRATED LAMP BASE AND LAMP HOLDER STRUCTURE COMPRISING THE SAME

(71) Applicants: SOLAR NATION POWERTECH ENTERPRISES COMPANY LIMITED, Guangzhou (CN); DONGGUAN HONGHAI OPTOELECTRONIC TECHNOLOGY CO., LTD, Dongguan (CN)

(72) Inventors: Bo Tan, Guangzhou (CN); Ling Qin, Dongguan (CN)

(73) Assignees: SOLAR NATION POWERTECH ENTERPRISES COMPANY LIMITED, Guangzhou (CN); DONGGUAN HONGHAI OPTOELECTRONIC TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 19/257,518

(22) Filed: Jul. 2, 2025

(65) Prior Publication Data

US 2026/0009528 A1 Jan. 8, 2026

(30) Foreign Application Priority Data

Jul. 4, 2024 (CN) ........................ 202421565621.X
Aug. 5, 2024 (CN) ........................ 202421868427.9

(51) Int. Cl.

| | |
|---|---|
| ***F21V 23/06*** | (2006.01) |
| ***F21V 15/01*** | (2006.01) |
| ***F21V 23/00*** | (2015.01) |

(52) U.S. Cl.

CPC .............. *F21V 23/06* (2013.01); *F21V 15/01* (2013.01); *F21V 23/002* (2013.01)

(58) Field of Classification Search

CPC ........ F21V 23/06; F21V 15/01; F21V 23/002; F21V 23/00; F21V 23/001; F21V 15/00; F21V 15/012

See application file for complete search history.

(56) References Cited

U.S. PATENT DOCUMENTS

| | | | | |
|---|---|---|---|---|
| 10,900,656 B1 * | 1/2021 | Wang | ........................ | F21V 3/00 |
| 2010/0177507 A1 * | 7/2010 | West | ........................ | H02J 7/751<br>362/183 |
| 2017/0343169 A1 * | 11/2017 | Yu | ............................ | F21S 4/10 |
| 2018/0372278 A1 * | 12/2018 | Zhang | ..................... | F21K 9/237 |

* cited by examiner

*Primary Examiner* — Bao Q Truong

(57) ABSTRACT

An integrated lamp base without an inner frame and a lamp holder structure are provided. The lamp holder structure includes the integrated lamp base, a T-shaped insulating base, horizontal wires, and vertical wires. The integrated lamp base includes the lamp base body that defines a connecting cavity therein, a connecting thread is disposed on an inner wall of the lamp base body within the connecting cavity. A wire connecting portion is fixed at a bottom portion of the lamp base body, a terminal post is disposed at an inner bottom end of the lamp base body and extends into the wire connecting portion, and a bottom portion of the terminal post passes through a bottom portion of the wire connecting portion. The T-shaped insulating base includes a T-shaped internal insulating frame and a partition plate, and the T-shaped internal insulating frame includes a frame body.

12 Claims, 7 Drawing Sheets

INTEGRATED LAMP BASE AND LAMP HOLDER STRUCTURE COMPRISING THE SAME

TECHNICAL FIELD

The present disclosure relates to the field of insulating components, and in particular to an integrated lamp base without an inner frame and a lamp holder structure comprising the same.

BACKGROUND

In modern electrical equipment and electronic devices, insulating components play a vital role. The insulating components effectively prevent current leakage, short circuits, and interference between electrical devices, thereby ensuring operational reliability of the electrical devices and user safety. With technological advancement and rapid development in the electrical industry, higher demands are placed on performance, reliability, and applicability of the insulating components.

Currently, lamp bases and lamp holder structures are widely used in the lighting industry. Manufacture of conventional lamp bases on light strings generally involves three steps, including injection molding of a plastic socket body, assembly of positive and negative spring contacts, placing the plastic socket body in a mold, and overmolding a Polyvinyl Chloride (PVC) outer layer onto the plastic socket body after the plastic socket body is placed in a mold. However, such a manufacturing process not only increases production costs but also requires specialized equipment for assembling the positive and negative spring contacts and the plastic socket body before overmolding, so that an overall process is relatively complex, and during injection molding, defects, such as pinholes, uneven wall thickness, substrate exposure, and shrinkage are prone to occur. Moreover, resin leakage easily occurs between the plastic socket body and a PVC lamp base, causing difficulty in screwing in bulbs or poor electrical contact.

Additionally, the lamp holder structures often include other insulating components besides the lamp bases, such as T-shaped internal insulating frames. Current T-shaped internal insulating frames are typically made of insulating materials (e.g., plastic, rubber) to provide stable support and insulation for the light strings.

As shown in FIG. 13, a conventional T-shaped internal insulating frame is made of two closable plastic housings, each of the two closable plastic housings further includes a horizontal portion 17.1 and a vertical portion 17.2. Each horizontal portion 17.1 defines a first wiring slot penetrating the conventional T-shaped internal insulating frame for accommodating two horizontal wires 17.4. Each vertical portion 17.2 defines a second wiring slot at a bottom of a corresponding one of the two closable plastic housings, along with a baffle 17.3 disposed therein to effectively separate two vertical wires 17.5 entering thereinto. During use, the two closable plastic housings are first separated. A user strips ends of the two horizontal wires 17.4 in a horizontal direction and the two vertical wires 17.5 in a vertical direction, then separates the two vertical wires 17.5 in the vertical direction using each baffle 17.3. Next, each of the ends of the two vertical wires 17.5 are connected to respective ones of the two horizontal wires 17.4, ensuring staggered connection points between the two vertical wires 17.5 and the horizontal wires 17.4 to prevent short circuits at contact joints. Finally, the two closable plastic housings are closed, at which point the closable plastic housings provide protective coverage for connection points between the two vertical wires 17.5 and the horizontal wires 17.4.

However, the conventional T-shaped internal insulating frame still exhibits certain issues. Each first wiring slot in the horizontal direction has a straight-line cross-section, causing the connection points between the two vertical wires 17.5 and the horizontal wires 17.4 to be offset from each other by a certain distance, which causes significant operational inconvenience during manufacturing. Specifically, during wiring operations, misalignment of the connection points between the two vertical wires 17.5 and the horizontal wires 17.4 prevent simultaneous operation, substantially increasing operation time, introducing workflow inefficiencies, and rendering automation unfeasible, severely impacting production efficiency.

Simultaneously, although each baffle 17.3 separates the two vertical wires 17.5 in the vertical portion, the two horizontal wires 17.4 remain unisolated. Thus, although the connection points between the two vertical wires 17.5 and the horizontal wires 17.4 are staggered, short-circuit risks persist. Specifically, in manufacturing process, when connecting each of the ends of the two vertical wires 17.5 to the respective ones of the two horizontal wires 17.4, some conductive strands may remain incompletely connected. During subsequent overmolding of the conventional T-shaped internal insulating frame, injection pressure may cause these loose conductive strands to come into unintended contact, resulting in short circuits. Furthermore, during use, wire pulling may cause contact between the connection points between the horizontal wires 17.4 and the two vertical wires 17.5, leading to short circuits.

Therefore, simplifying the lamp holder structures, improving manufacturing efficiency of the lamp bases, and enhancing insulation reliability and installation convenience of the T-shaped internal insulating frames pose critical technical challenges in the field.

SUMMARY

Based on above, the present disclosure aims to provide an integrated lamp base without an inner frame and a lamp holder structure comprising the same to solve technical provides mentioned in the background.

In order to achieve above aims, the present disclosure provides following technical solutions.

The integrated lamp base without the inner frame is provided, comprising a lamp base body. The lamp base body defines a connecting cavity therein, a connecting thread is disposed on an inner wall of the lamp base body within the connecting cavity, and the connecting thread is centrally located within the connecting cavity.

A wire connecting portion is fixed at a bottom portion of the lamp base body, a terminal post is disposed at an inner bottom end of the lamp base body and extends into the wire connecting portion, a bottom portion of the terminal post passes through a bottom portion of the wire connecting portion, and the terminal post is electrically connected to vertical wires.

Accordingly, the integrated lamp base comprises the lamp base body that defines the connecting cavity therein. The connecting thread is disposed within the connecting cavity, so as to threadedly engage with an external thread of a lighting bulb when connecting to the lighting bulb. Moreover, a terminal end of the lighting bulb is connected to the terminal post, thereby achieving operational convenience. Meanwhile, such design eliminates need for separately manufacturing a plastic lamp cup and subsequently injection-molding an outer housing, which avoids manufacturing complexity, reduces overall manufacturing costs, and improves production efficiency.

Furthermore, an inward-protruding lip is integrally formed at an inner top portion of the lamp base body, and a thickness of the inward-protruding lip is less than a thickness of the lamp base body.

Accordingly, the inward-protruding lip and the lamp base body are integrally injection-molded. Since the thickness of the inward-protruding lip is less than the thickness of the lamp base body, the inward-protruding lip is deformed under pressure when the lighting bulb is installed. After the lighting bulb is fully seated, the inward-protruding lip returns to an original position thereof, thereby enhancing overall connection stability.

Furthermore, a mounting hole matching with the terminal post penetrates through the wire connecting portion and extends into the lamp base body.

Accordingly, the mounting hole is configured to mount and fix the terminal post, thereby simplifying an overall installation process of the integrated lamp base.

Furthermore, the terminal post comprises a positive contact spring and a negative contact spring. The mounting hole consists of a positive contact spring mounting hole and a negative contact spring mounting hole. The positive contact spring and the negative contact spring are respectively disposed in the positive contact spring mounting hole and the negative contact spring mounting hole.

Furthermore, the integrated lamp base is integrally injection-molded from Polyvinyl Chloride (PVC) material having a Shore A hardness of 85-95.

Accordingly, the integrated lamp base is manufactured using the PVC material with a specific hardness range, which ensures flexibility of the PVC material for integrated injection molding, allows an internal threaded feature of the integrated lamp base to meet required precision, and guarantees hardness of the PVC material to prevent the integrated lamp base from softening at high temperatures in daily use, thereby avoiding disconnection between the lighting bulb and the integrated lamp base or poor contact.

Furthermore, a nut is fixed on an outer side of the lamp base body, a cross section of the nut is octagonal, and the nut and the lamp base body are integrally injection-molded.

Accordingly, the nut allows for easier manual engagement between the lamp base body and the lighting bulb, which is convenient for tightening of the connecting thread and the external thread of the lighting bulb.

The present disclosure further provides the lamp holder structure, comprising the integrated lamp base as foregoing, a T-shaped insulating base, horizontal wires, and the vertical wires. The horizontal wires and the vertical wires are partially disposed in the T-shaped insulating base, and the T-shaped insulating base is electrically connected to the integrated lamp base through the vertical wires.

Furthermore, the T-shaped insulating base comprises a T-shaped internal insulating frame and an insulating housing, and the insulating housing covers an outer periphery of the T-shaped internal insulating frame. The T-shaped internal insulating frame comprises a frame body, the frame body defines a wire chamber, the wire chamber penetrates through two sides and a bottom portion of the frame body, so that a cross section of the frame body is U-shaped.

Furthermore, the T-shaped internal insulating frame further comprises a partition plate, the partition plate is disposed at a central portion of the wire chamber, and a distance between a first outer wall of the partition plate and a first inner side wall of the wire chamber is equal to a distance between a second outer wall of the partition plate and a second inner side wall of the wire chamber.

Accordingly, the horizontal wires and the vertical wires are smoothly mounted in the frame body, so that connection points of two sets of the horizontal wires and two sets of the vertical wires are separated by the partition plate, thereby preventing mutual interference at the connection points of the two sets of the horizontal wires and the vertical wires during use.

Furthermore, the partition plate is fixedly connected to an inner bottom wall of the wire chamber, and the partition plate divides the wire chamber into a first wire channel and a second wire channel. Optionally, the partition plate and the wire chamber are integrally injection-molded.

Accordingly, a position of the partition plate within the wire chamber is fixed to ensure stability of the partition plate during use. The first wire channel and the second wire channel also ensure that the two sets of the horizontal wires and the two sets of the vertical wires are all smoothly disposed in the frame body.

Furthermore, the partition plate extends outward from the inner bottom wall of the wire chamber and protrudes out of the frame body.

Accordingly, the partition plate protrudes out of the frame body to ensure complete isolation between the two sets of the vertical wires, thereby reducing a risk of short circuits.

Furthermore, reinforcing ribs are disposed on inner walls of the frame body at side opening portions of the frame body, and the reinforcing ribs are integrally formed with the frame body.

Furthermore, two sets of the reinforcing ribs are symmetrically disposed on the inner walls, and each of the two sets of the reinforcing ribs comprises two reinforcing ribs. A distance between each two reinforcing ribs is less than a distance between the inner walls of the frame body.

Accordingly, the reinforcing ribs are configured to limit the horizontal wires, thereby enhancing stability of the side opening portions of the frame body during use.

Furthermore, protrusions are disposed on an outer wall of the frame body, the protrusions and the frame body are integrally formed.

Accordingly, subsequent handling of the frame body by users or automated equipment is facilitated.

The present further provides a method of manufacturing the lamp holder structure, comprising following steps.

S1: separately injection-molding the T-shaped internal insulating frame and the integrated lamp base.

S2: simultaneously stripping corresponding segments of the two sets of the horizontal wires, and thereafter connecting end portions of the two sets of the vertical wires to stripped portions of the two sets of the horizontal wires.

S3: after connecting the end portions of the two sets of the vertical wires to the stripped portions of the two sets of the horizontal wires, sequentially placing the two sets of the horizontal wires and the two sets of the vertical wires into the first wire channel and the second wire channel to avoid contact between the connection points of the two sets of the horizontal wires and the two sets of the vertical wires.

S4: injection-molding the insulating housing around the T-shaped internal insulating frame with the two sets of the horizontal wires and the two sets of the vertical wires disposed therein to form the T-shaped insulating base, where the T-shaped insulating base is electrically connected to the integrated lamp base through the two sets of the vertical wires, and the T-shaped insulating base and the integrated lamp base together constitute the lamp holder structure.

Specifically, in the S1, injection-molding the integrated lamp base comprises following steps.

S11: riveting the positive contact spring and the negative contact spring to positive poles of the two sets of the vertical wires and negative poles of the two sets of the vertical wires, thereafter respectively placing the two sets of the vertical wires, the positive contact spring, and the negative contact spring in corresponding mold slots of an outer mold of the integrated lamp base to avoid displacement.

S12: placing a mold insert corresponding to the integrated lamp base into a mold cavity of the outer mold, followed by injection molding.

S13: extracting the mold insert by thermal expansion and contraction during cooling of the PVC material after the injection molding to obtain the integrated lamp base after solidification.

Based on above, beneficial effects of the present disclosure are as follows.

According to the integrated lamp base of the present disclosure, the integrated lamp base comprises the lamp base body that defines the connecting cavity therein. The connecting thread is disposed within the connecting cavity, so as to threadedly engage with the external thread of the lighting bulb when connecting to the lighting bulb. Moreover, the terminal end of the lighting bulb is connected to the terminal post, thereby achieving the operational convenience. Meanwhile, such design eliminates the need for separately manufacturing the plastic lamp cup and subsequently injection-molding the outer housing, which avoids the manufacturing complexity, eliminates need for separate plastic lamp cup materials, and reduces labor costs associated with assembling the positive contact spring and the negative contact spring. Compared to conventional lamp base structures and corresponding manufacturing process, the present disclosure effectively reduces the overall manufacturing costs, improves the production efficiency, and improves qualified rate of lamp base injection molding. Since the thickness of the inward-protruding lip is less than the thickness of the lamp base body, the inward-protruding lip is deformed under pressure when the lighting bulb is installed. After the lighting bulb is fully seated, the inward-protruding lip returns to the original position thereof, thereby enhancing the overall connection stability. Meanwhile, the integrated lamp base is manufactured using the PVC material with the specific hardness range, which ensures the flexibility of the PVC material for the integrated injection molding, allows the internal threaded feature of the integrated lamp base to meet the required precision, and guarantees the hardness of the PVC material to prevent the integrated lamp base from softening at the high temperatures in daily use, thereby avoiding the disconnection between the lighting bulb and the integrated lamp base or the poor contact.

Additionally, the T-shaped internal insulating frame is provided with the wire chamber and the partition plate, so that the connection points of the two sets of the horizontal wires and the two sets of vertical wires are separated by the partition plate, thereby preventing the mutual interference at the connection points of the two sets of the horizontal wires and the two sets of the vertical wires during use. Even in cases where the connection points of the two sets of the horizontal wires and the two sets of the vertical wires become loose or shift due to impact of an injection molding process or improper use during daily operation, especially when excessive force is applied to pull the two sets of the horizontal wires, the T-shaped internal insulating frame prevents physical contact between the two connection points of the two sets of the horizontal wires and the two sets of the vertical wires, thereby avoiding short circuit accidents. Moreover, thanks to a special structure of the T-shaped internal insulating frame, the two sets of horizontal wires are simultaneously stripped at the same position, then connected to the two sets of the vertical wires, and finally separately placed into the first wire channel and the second wire channel formed within the frame body by the dividing the wire chamber through the partition plate. Such design significantly facilitates mechanized assembly and is highly suitable for widespread application and promotion.

Figure 1:
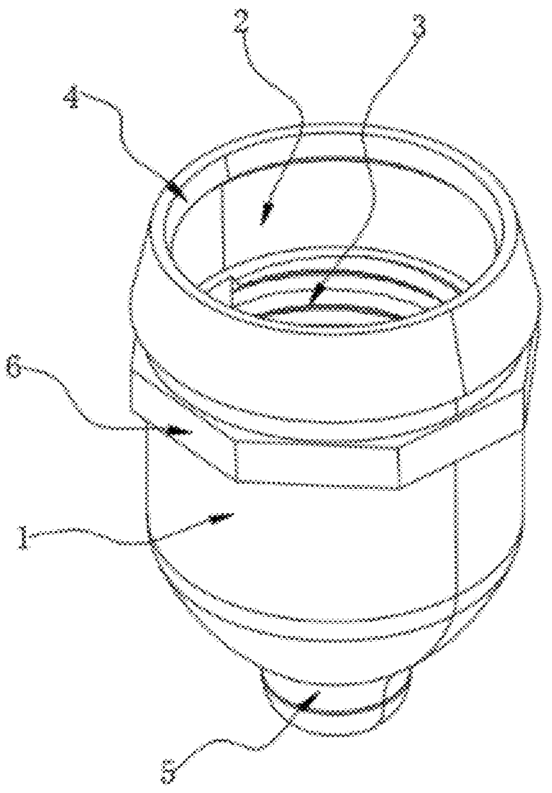
FIG. 1 is a structural schematic diagram of an integrated lamp base according to the present disclosure.

Reference numerals in the drawings: 1. lamp base body; 2. connecting cavity; 3. connecting thread; 4. inward-protruding lip; 5. wire connecting portion; 6. nut; 7. terminal post; 7.1. positive contact spring; 7.2. negative contact spring; 8. flat-top lamp base; 9. T-shaped insulating base; 10. horizontal wire; 11. vertical wire; 12. frame body; 13. wire chamber; 13.1. first wire channel; 13.2. second wire channel; 14. partition plate; 15. reinforcing rib; 16. protrusion; 17.1. horizontal portion in the prior art; 17.2. vertical portion in the prior art; 17.3. baffle in the prior art; 17.4. horizontal wire in the prior art; 17.5. vertical wire in the prior art.

DETAILED DESCRIPTION OF EMBODIMENTS

The technical solutions in embodiments of the present disclosure are clearly and completely described below with reference to accompanying drawings in the embodiments of the present disclosure. The embodiments described below with reference to the accompanying drawings are exemplary and are merely used to explain the present disclosure, and should not be construed as limiting the present disclosure.

Following describes the embodiments of the present disclosure according to an overall structure of the present disclosure.

Figure 2:
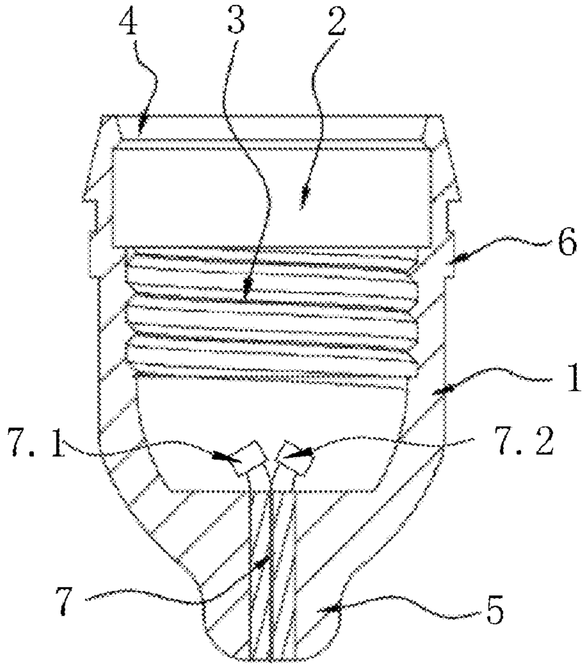
FIG. 2 is a cross-sectional schematic diagram of the integrated lamp base according to the present disclosure.
Figure 3:
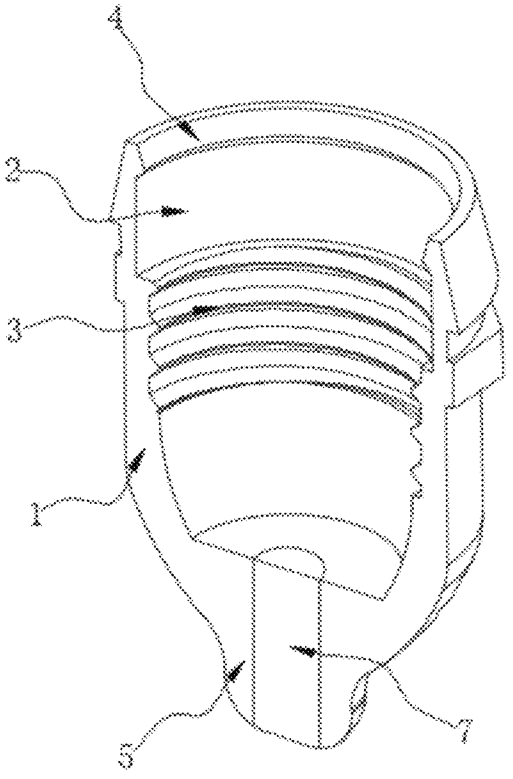
FIG. 3 is a section schematic diagram of the integrated lamp base according to the present disclosure.

The present disclosure provides an integrated lamp base without an inner frame, as shown in FIGS. 1-3, comprising a lamp base body 1. The lamp base body 1 defines a connecting cavity 2 therein, a connecting thread 3 is disposed on an inner wall of the lamp base body 1 within the connecting cavity 2, and the connecting thread 3 is centrally located within the connecting cavity 2.

A wire connecting portion 5 is fixed at a bottom portion of the lamp base body 1, a terminal post 7 is disposed at an inner bottom end of the lamp base body 1 and extends into the wire connecting portion 5, a bottom portion of the terminal post 7 passes through a bottom portion of the wire connecting portion 5, and the terminal post 7 is electrically connected to an external wire.

Specifically, the terminal post 7 comprises a positive contact spring 7.1 and a negative contact spring 7.2. The positive contact spring 7.1 and the negative contact spring 7.2 are respectively electrically connected to a positive pole and a negative pole of the external wire, such connection mode is a conventional connection mode in the art, details of which are not described herein again.

When the connecting thread 3 is connected to a lighting bulb, the connecting thread 3 is threadedly engaged with an external thread of the lighting bulb. Moreover, a terminal end of the lighting bulb is connected to the terminal post 7, thereby achieving operational convenience. Meanwhile, such design eliminates need for separately manufacturing a plastic lamp cup and subsequently injection-molding an outer housing, which avoids manufacturing complexity, reduces overall manufacturing costs, and improves production efficiency.

Furthermore, the integrated lamp base is injection-molded from Polyvinyl Chloride (PVC) material in a single injection molding step, an internal threaded shape of the integrated lamp base is formed by demolding a mold insert (core insert) corresponding to the integrated lamp base through thermal expansion and contraction during the injection molding. Specifically, the PVC material has a Shore A hardness of 85-95.

A specific shape and a specific size of the connecting thread 3 are not limited herein, the specific shape and the specific size of the connecting thread 3 are customized according to different types of the lighting bulb, so as to match different types of lighting bulb. In a manufacturing process, an outer mold of the integrated lamp base is kept unchanged, and different shapes and sizes of the connecting thread 3 are obtained by replacing the mold insert; even when the integrated lamp base is assembled with the lighting bulb through snap-fit or other connection methods, only a type of the mold insert needs to be replaced to form a corresponding internal snap-fit or alternative connection structure, details of which are not described herein.

Please refer to FIGS. 2-3, a mounting hole matching with the terminal post 7 penetrates through the wire connecting portion 5 and extends into the lamp base body 1. Accordingly, the mounting hole is configured to mount and fix the terminal post 7, thereby simplifying an overall installation process of the integrated lamp base.

Please refer to FIGS. 1-3, an inward-protruding lip 4 is integrally formed at an inner top portion of the lamp base body 1, and a thickness of the inward-protruding lip 4 is less than a thickness of the lamp base body 1. Accordingly, the inward-protruding lip 4 and the lamp base body 1 are integrally injection-molded. Since the thickness of the inward-protruding lip 4 is less than the thickness of the lamp base body 1, the inward-protruding lip 4 is deformed under pressure when the lighting bulb is installed. After the lighting bulb is fully seated, the inward-protruding lip 4 returns to an original position thereof, thereby enhancing overall connection stability.

Please refer to FIGS. 1-3, a nut 6 is fixed on an outer side of the lamp base body 1, a cross section of the nut 6 is octagonal, and the nut 6 and the lamp base body 1 are integrally injection-molded. Accordingly, the nut 6 allows for easier manual engagement between the lamp base body 1 and the lighting bulb, which is convenient for tightening of the connecting thread 3 and the external thread of the lighting bulb.

Figure 4:
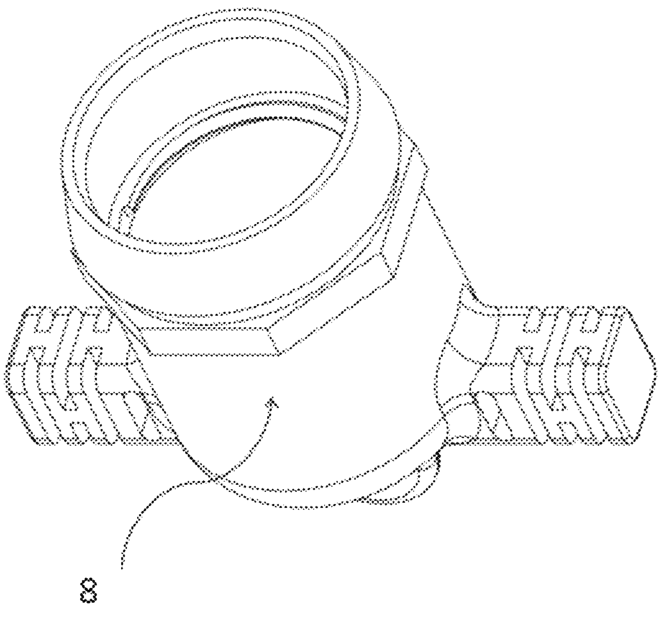
FIG. 4 is a three-dimensional structural schematic diagram of a flat-top lamp base according to the present disclosure.
Figure 5:
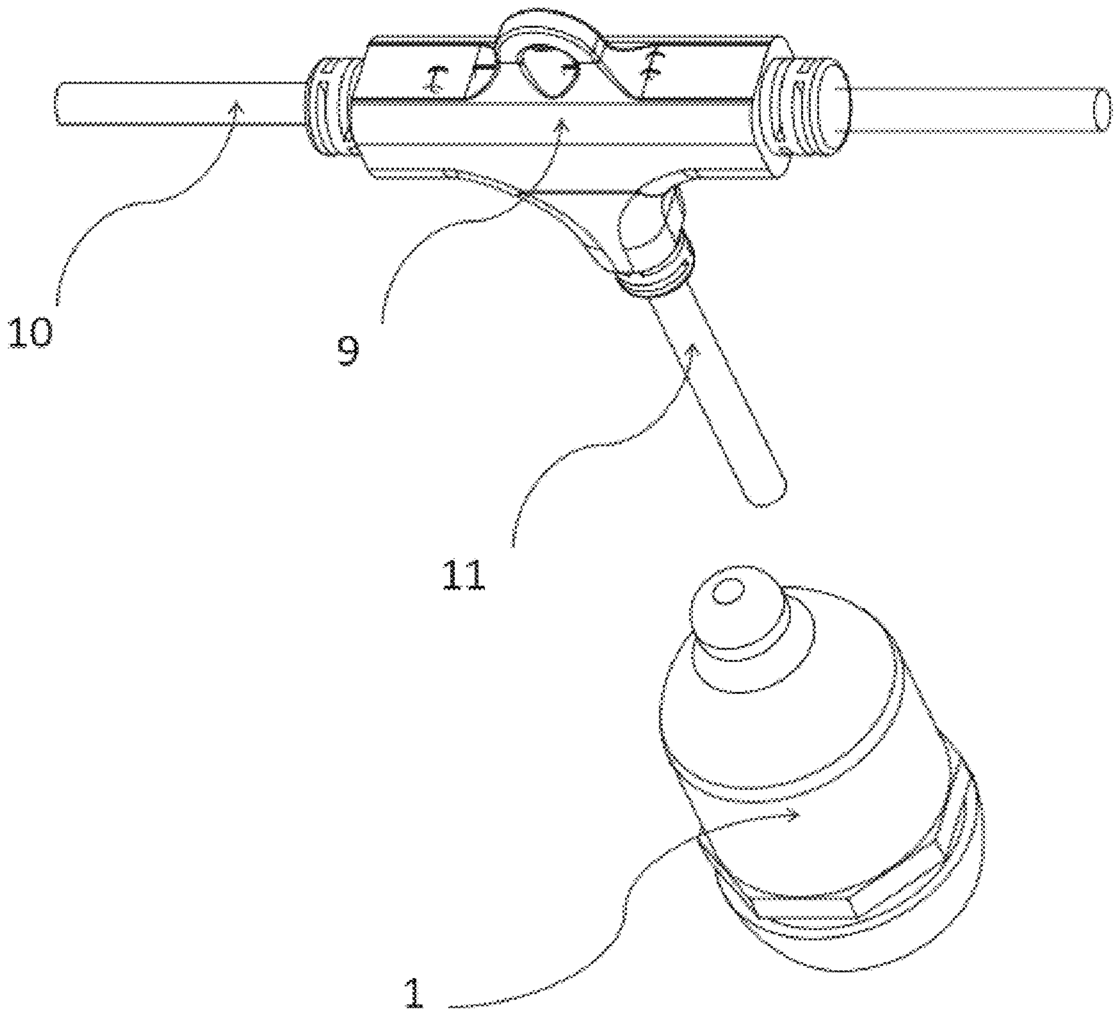
FIG. 5 is a three-dimensional structural schematic diagram of a pendant-type lamp base according to the present disclosure.
Figure 6:
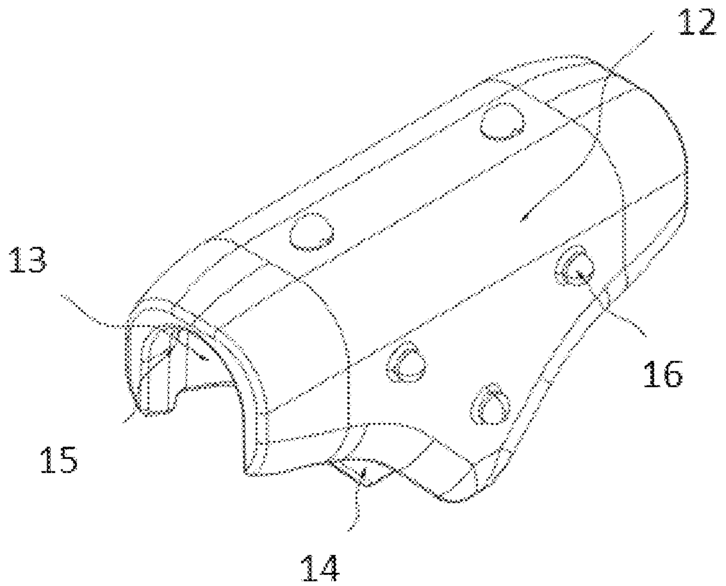
FIG. 6 is a structural schematic diagram of a T-shaped internal insulating frame according to the present disclosure.

Please refer to FIGS. 4-5, the integrated lamp base of the present disclosure is a flat-top lamp base 8 or a pendant-type lamp base, which is not limited herein.

During use, the connecting cavity 2 is defined in the lamp base body 1, the connecting thread 3 is disposed within the connecting cavity 2, the lamp base body 1, the connecting cavity 2, the connecting thread 3, and other components are integrally injection-molded, so as to threadedly engage the connecting thread 3 with the external thread of the lighting bulb when connecting to the lighting bulb. Moreover, the terminal end of the lighting bulb is connected to the terminal post 7, thereby achieving the operational convenience. Meanwhile, such design eliminates the need for separately manufacturing the plastic lamp cup and subsequently injection-molding the outer housing, which avoids the manufacturing complexity, reduces the overall manufacturing costs, and improves the production efficiency.

In a manufacturing process of the integrated lamp base, the positive contact spring and the negative contact spring are respectively riveted to a positive pole of a main wire and a negative pole of the main wire, then a riveted wire, the positive contact spring, and the negative contact spring are respectively placed in corresponding mold slots of the outer mold of the integrated lamp base to avoid displacement, further, the mold insert corresponding to the integrated lamp base is placed into a mold cavity of the outer mold, followed by injection molding. Finally, the mold insert is extracted by the thermal expansion and contraction during cooling of the PVC material after the injection molding to obtain the integrated lamp base after solidification.

Such integrated injection molding process employed in the present disclosure eliminates need for separate plastic lamp cup materials and reduces labor costs associated with assembling the positive contact spring and the negative contact spring. Compared to conventional lamp base structures and corresponding manufacturing process, the integrated injection molding process employed in the present disclosure effectively reduces the overall manufacturing costs, improves the production efficiency, and improves qualified rate of lamp base injection molding.

In another embodiment, the present disclosure further provides a lamp holder structure, as shown in FIGS. 5-12, comprising the integrated lamp base as foregoing, a T-shaped insulating base 9, horizontal wires 10, and vertical wires 11. The T-shaped insulating base 9 comprises a T-shaped internal insulating frame and an insulating housing, and the insulating housing covers an outer periphery of the T-shaped internal insulating frame.

The insulating housing covering outer periphery of the T-shaped internal insulating frame is formed through injection molding or other molding process, which is not limited herein.

The T-shaped insulating base 9 is connected to the integrated lamp base 9 through the vertical wires 11.

The T-shaped internal insulating frame comprises a frame body 12, the frame body 12 defines a wire chamber 13, the wire chamber 13 is configured to accommodate the horizontal wires 10 and the vertical wires 11, so that the horizontal wires 10 and the vertical wires are smoothly mounted in the frame body 12.

Furthermore, the T-shaped internal insulating frame further comprises a partition plate 14, the partition plate 14 is in contact with the horizontal wires 10, and the horizontal wires 10 are connected to the vertical wires 11. Meanwhile, the partition plate 14 is disposed at a central portion of the wire chamber 13, and a distance between a first outer wall of the partition plate 14 and a first inner side wall of the wire chamber 13 is equal to a distance between a second outer wall of the partition plate 14 and a second inner side wall of the wire chamber 13.

During installation of the horizontal wires 10 and the vertical wires 11, the partition plate 14 physically separates two sets of the horizontal wires 10 and two sets of the vertical wires 11, preventing mutual interference. Consequently, during subsequent processing, corresponding segments of the two sets of the horizontal wires 10 are simultaneously stripped, so that manual stripping operations are simplified. Moreover, automated equipment is also a selection for stripping the corresponding segments of the two sets of the horizontal wires 10. As a result, streamlined processing and assembly of the horizontal wires 10 and the vertical wires 11 connected through the frame body 12 are enabled.

Figure 7:
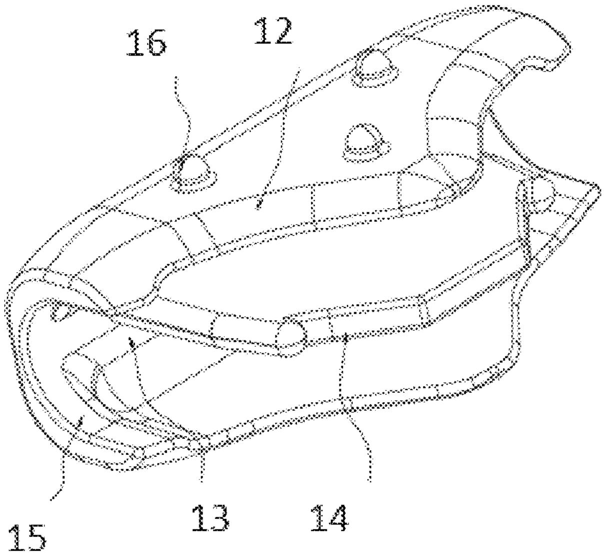
FIG. 7 is another structural schematic diagram of the T-shaped internal insulating frame according to the present disclosure.
Figure 8:
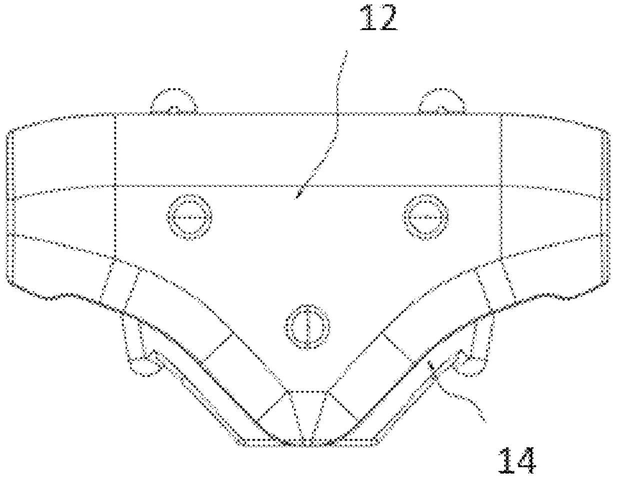
FIG. 8 is a front schematic diagram of the T-shaped internal insulating frame according to the present disclosure.
Figure 9:
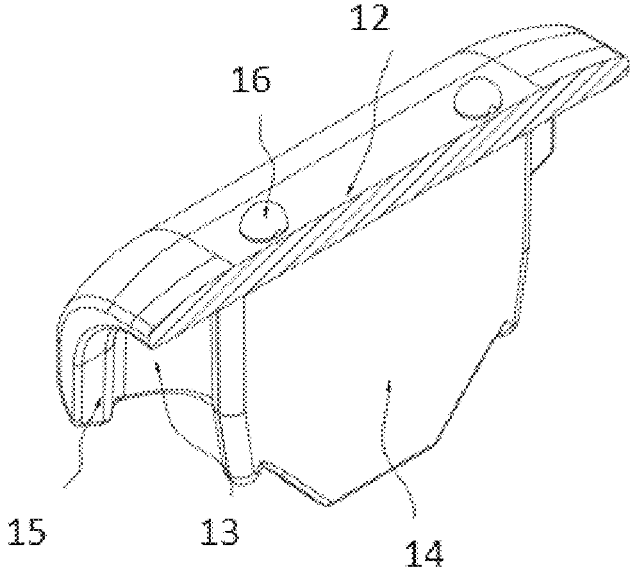
FIG. 9 is a partial section schematic diagram of a frame body according to the present disclosure.
Figure 10:
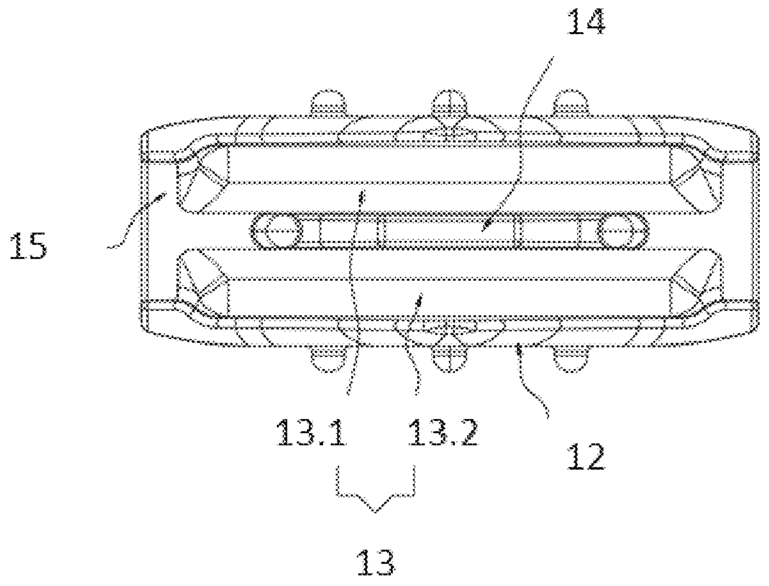
FIG. 10 is a bottom schematic diagram of the frame body according to the present disclosure.
Figure 11:
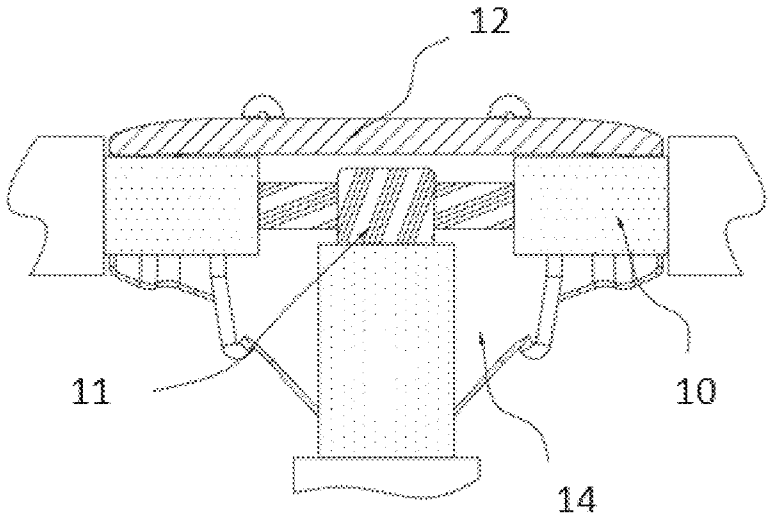
FIG. 11 is a front cross-sectional schematic diagram of the T-shaped internal insulating frame in use according to the present disclosure.
Figure 12:
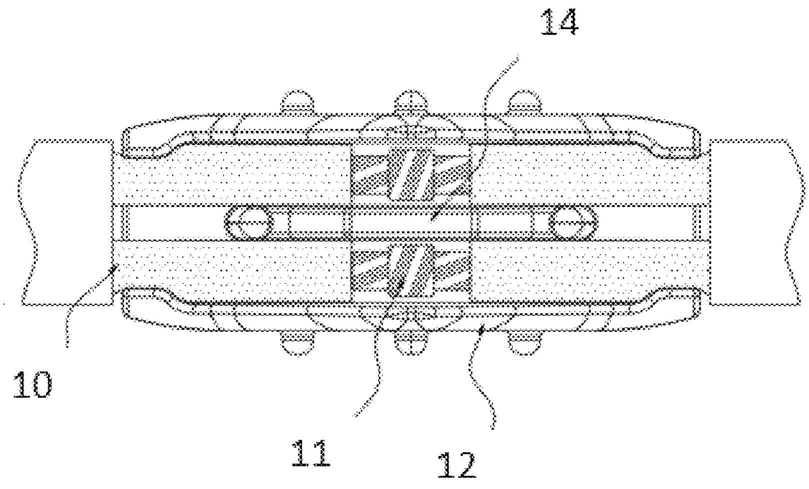
FIG. 12 is a bottom schematic diagram of the T-shaped internal insulating frame in use according to the present disclosure.
Figure 13:
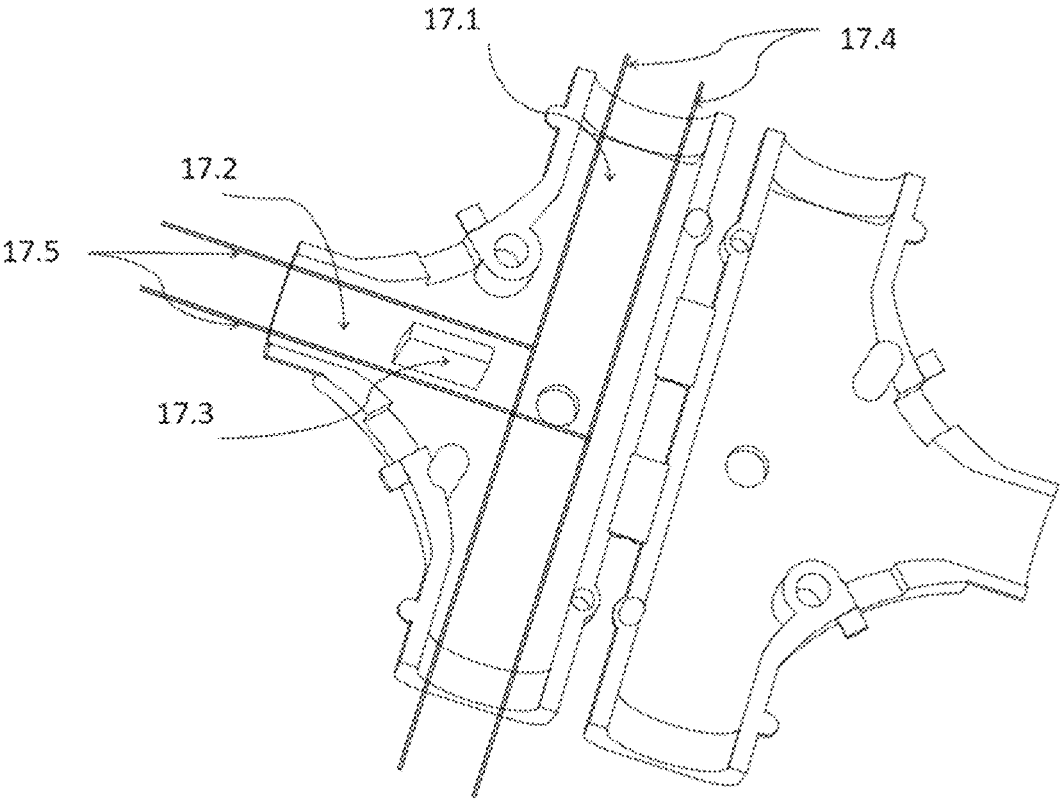
(Prior Art) FIG. 13
FIG. 13 is a structural schematic diagram of a conventional T-shaped internal insulating frame in the prior art.

Please refer to FIGS. 7-9, the wire chamber 13 penetrates through two sides and a bottom portion of the frame body 12, so that a cross section of the frame body 12 is U-shaped. In this way, the horizontal wires 10 and the vertical wires 11 are smoothly mounted in the frame body 12.

Please refer to FIGS. 6-9, a length of the partition plate 14 in a horizontal direction (i.e., an axial direction of the horizontal wires 10) is slightly shorter than a length of the frame body 12 in the same transverse direction. Such configuration allows the two sets of the horizontal wires 10 to be effectively separated by the partition plate 14 while ensuring that the partition plate 14 does not obstruct the two sets of the horizontal wires 10 from entering the frame body 12. Specifically, the length of the partition plate 14 in the horizontal direction is approximately half of the length of the frame body 12 in the same horizontal direction, and both are aligned along the same central axis, meaning the partition plate 14 is centrally positioned within the inner frame body 12 along the transverse direction.

Moreover, since a bottom portion of the partition plate 14 (the side not connected to the wire chamber 13) protrudes out of the frame body 12, the two sets of the horizontal wires 10 and the two sets of the vertical wires 11 are effectively separated by the partition plate 14. Such configuration prevents contact between connection points of the two sets of the horizontal wires 10 and the two sets of the vertical wires 11, thereby avoiding risks, such as short circuits, even if the two sets of the horizontal wires 10 undergo stripping at the same position.

Please refer to FIGS. 7-9, the partition plate 14 is fixedly connected to an inner bottom wall of the wire chamber 13, so that a position of the partition plate 14 within the wire chamber 13 is fixed to ensure stability of the partition plate 14 during use. Meanwhile, the partition plate 14 divides the wire chamber 13 into a first wire channel 13.1 and a second wire channel 13.2, facilitating placement of the two sets of the horizontal wires 10 and the two sets of the vertical wires 11 into corresponding compartments Furthermore, the partition plate 14 maintains permanent physical isolation between the connection points of the two sets of the horizontal wires 10 and the two sets of the vertical wires 11. Such isolation persists even during subsequent injection molding processes or routine use, effectively preventing the contact between the connection points of the two sets of the horizontal wires 10 and the two sets of the vertical wires 11 due to injection molding pressure or operational mishandling, thereby eliminating risks of short circuits.

Please refer to FIGS. 7 and 9, reinforcing ribs 15 are disposed on inner walls of the frame body 12 at side opening portions of the frame body 12, and the reinforcing ribs 15 are integrally formed with the frame body 12, thereby enhancing strength at the side opening portions of the frame body 12 and improving structural stability during use. During use, the reinforcing ribs 15 abut against outer surfaces of the horizontal wires 10 to provide positional constraint.

Two sets of the reinforcing ribs 15 are symmetrically disposed on the inner walls, and each of the two sets of the reinforcing ribs 15 comprises two reinforcing ribs 15. Such configuration further ensures structural stability of end openings of the frame body 12. Moreover, a distance between each two reinforcing ribs 15 is less than a distance between the inner walls of the frame body 12, thereby enabling effective constraint of the two sets of the horizontal wires 10 and improving connection stability between the two sets of the horizontal wires 10 and the frame body 12.

Please refer to FIGS. 7-9, protrusions 16 are disposed on an outer wall of the frame body 12, facilitating subsequent handling of the frame body 12 by users or the automated equipment. Moreover, the protrusions 16 and the frame body 12 are integrally formed, ensuring a fixed and stable connection therebetween.

When connecting the two sets of the horizontal wires 10 to the two sets of the vertical wires 11, the corresponding segments of the two sets of the horizontal wires 10 are simultaneously stripped, this operation is performed either manually or using the automated equipment. Then, end portions of the two sets of the vertical wires 11 is connected to stripped portions of the two sets of the horizontal wires 10.

After connecting the end portions of the two sets of the vertical wires 11 to the stripped portions of the two sets of the horizontal wires 10, the two sets of the horizontal wires 10 and the two sets of the vertical wires 11 are sequentially placed into the first wire channel 13.1 and the second wire channel 13.2, at this time, the partition plate 14 physically separates the two sets of the horizontal wires 10 and the two sets of the vertical wires 11, thereby avoiding contact between the connection points of the two sets of the horizontal wires 10 and the two sets of the vertical wires 11. Then, connection between the two sets of the horizontal wires 10, the two sets of the vertical wires 11, and the frame body 12 is completed.

The present further provides a method of manufacturing the lamp holder structure, comprising following steps.

S1: separately injection-molding the T-shaped internal insulating frame and the integrated lamp base.

S2: simultaneously stripping the corresponding segments of the two sets of the horizontal wires 10, and thereafter connecting the end portion of the vertical wires 11 to the stripped portions of the two sets of the horizontal wires 10.

S3: after connecting the end portion of the vertical wires 11 to the stripped portions of the two sets of the horizontal wires 10, sequentially placing the two sets of the horizontal wires 10 and the two sets of the vertical wires 11 into the first wire channel 13.1 and the second wire channel 13.2 to avoid the contact between the connection points of the two sets of the horizontal wires 10 and the two sets of the vertical wires 11.

S4: injection-molding the insulating housing around the T-shaped internal insulating frame with the two sets of the horizontal wires 10 and the two sets of the vertical wires 11 disposed therein to form the T-shaped insulating base 9, where the T-shaped insulating base 9 is electrically connected to the integrated lamp base through the two sets of the vertical wires 11, and the T-shaped insulating base 9 and the integrated lamp base together constitute the lamp holder structure.

Specifically, in the S1, injection-molding the integrated lamp base comprises following steps.

S11: riveting the positive contact spring 7.1 and the negative contact spring 7.2 to a positive pole and a negative pole of each of the two sets of the vertical wires 11, thereafter respectively placing the two sets of the vertical wires 11, the positive contact spring 7.1, and the negative contact spring 7.2 in the corresponding mold slots of the outer mold of the integrated lamp base to avoid the displacement.

S12: placing the mold insert corresponding to the integrated lamp base into the mold cavity of the outer mold, followed by the injection molding.

S13: extracting the mold insert by the thermal expansion and contraction during cooling of the PVC material after the injection molding to obtain the integrated lamp base after the solidification.

While the embodiments of the present disclosure have been illustrated and described, these specific embodiments are merely exemplary and not intended to limit a scope of the present disclosure. Specific features, structures, materials, or characteristics described herein may be combined in any manner suitable for one or more embodiments or examples. Those skilled in the art should appreciate, upon reading the present specification, that modifications, substitutions, or variations not involving an inventive contribution may be made to the embodiments without departing from principles and objectives of the present disclosure. All such modifications, substitutions, or variations falling within a scope of appended claims are expressly protected by the patent law.

What is claimed is:

1. An integrated lamp base, comprising:

a lamp base body;

wherein the lamp base body defines a connecting cavity therein, a connecting thread is disposed on an inner wall of the lamp base body within the connecting cavity, and the connecting thread is centrally located within the connecting cavity;

a wire connecting portion is fixed at a bottom portion of the lamp base body, a terminal post is disposed at an inner bottom end of the lamp base body and extends into the wire connecting portion, a bottom portion of the terminal post passes through a bottom portion of the wire connecting portion, and the terminal post is electrically connected to an external wire;

wherein a mounting hole matching with the terminal post penetrates through the wire connecting portion and extends into the lamp base body;

wherein the terminal post comprises a positive contact spring and a negative contact spring;

the mounting hole consists of a positive contact spring mounting hole and a negative contact spring mounting hole; and the positive contact spring and the negative contact spring are respectively disposed in the positive contact spring mounting hole and the negative contact spring mounting hole.

2. The integrated lamp base according to claim 1, wherein an inward-protruding lip is integrally formed at an inner top portion of the lamp base body, and a thickness of the inward-protruding lip is less than a thickness of the lamp base body.

3. The integrated lamp base according to claim 1, wherein the integrated lamp base is integrally injection-molded from Polyvinyl Chloride (PVC) material having a Shore A hardness of 85-95.

4. A lamp holder structure, comprising:

the integrated lamp base according to claim 3, a T-shaped insulating base;

horizontal wires; and vertical wires;

wherein the horizontal wires and the vertical wires are partially disposed in the T-shaped insulating base, and the T-shaped insulating base is electrically connected to the integrated lamp base through the vertical wires.

5. The lamp holder structure according to claim 4, wherein the T-shaped insulating base comprises a T-shaped internal insulating frame and an insulating housing, and the insulating housing covers an outer periphery of the T-shaped internal insulating frame; and the T-shaped internal insulating frame comprises a frame body, the frame body defines a wire chamber, the wire chamber penetrates through two sides and a bottom portion of the frame body, so that a cross section of the frame body is U-shaped.

6. The lamp holder structure according to claim 5, wherein the T-shaped internal insulating frame further comprises a partition plate, the partition plate is disposed at a central portion of the wire chamber, and a distance between a first outer wall of the partition plate and a first inner side wall of the wire chamber is equal to a distance between a second outer wall of the partition plate and a second inner side wall of the wire chamber.

7. The lamp holder structure according to claim 6, wherein the partition plate is fixedly connected to an inner bottom wall of the wire chamber, and the partition plate divides the wire chamber into a first wire channel and a second wire channel.

8. The lamp holder structure according to claim 7, wherein the partition plate extends outward from the inner bottom wall of the wire chamber and protrudes out of the frame body.

9. The lamp holder structure according to claim 5, wherein reinforcing ribs are disposed on inner walls of the frame body at side opening portions of the frame body, and the reinforcing ribs are integrally formed with the frame body.

10. The lamp holder structure according to claim 9, wherein two sets of the reinforcing ribs are symmetrically disposed on the inner walls, and each of the two sets of the reinforcing ribs comprises two reinforcing ribs; and a distance between each two reinforcing ribs is less than a distance between the inner walls of the frame body.

11. A method of manufacturing the lamp holder structure according to claim 8, comprising:

S1: separately injection-molding the T-shaped internal insulating frame and the integrated lamp base;

S2: simultaneously stripping corresponding segments of two sets of the horizontal wires, and thereafter connecting end portion of two sets of the vertical wires to stripped portions of the two sets of the horizontal wires;

S3: after connecting the end portions of the two sets of the vertical wires to the stripped portions of the two sets of the horizontal wires, sequentially placing the two sets of the horizontal wires and the two sets of the vertical wires into the first wire channel and the second wire channel to avoid contact between connection points of the two sets of the horizontal wires and the two sets of the vertical wires; and S4: injection-molding the insulating housing around the T-shaped internal insulating frame with the two sets of the horizontal wires and the two sets of the vertical wires disposed therein to form the T-shaped insulating base, wherein the T-shaped insulating base is electrically connected to the integrated lamp base through the two sets of the vertical wires, and the T-shaped insulating base and the integrated lamp base together constitute the lamp holder structure.

12. The method of manufacturing the lamp holder structure according to claim 11, wherein in the S1, injection-molding the integrated lamp base comprises:

S11: riveting the positive contact spring and the negative contact spring to a positive pole and a negative pole of each of the two sets of the vertical wires, thereafter respectively placing the two sets of the vertical wires, the positive contact spring, and the negative contact spring in corresponding mold slots of an outer mold of the integrated lamp base to avoid displacement;

S12: placing a mold insert corresponding to the integrated lamp base into a mold cavity of the outer mold, followed by injection molding; and S13: extracting the mold insert by thermal expansion and contraction during cooling of the PVC material after the injection molding to obtain the integrated lamp base after solidification.

* * * * *